United States Patent [19]
Mitchell

[11] 3,843,822
[45] Oct. 22, 1974

[54] METHOD FOR PREPARING SUCROSE-FIXED ACETALDEHYDE

[75] Inventor: William A. Mitchell, Lincoln Park, N.J.

[73] Assignee: General Foods Corporation, White Plains, N.Y.

[22] Filed: Sept. 24, 1973

[21] Appl. No.: 400,463

[52] U.S. Cl................ 426/380, 426/175, 426/442, 426/456
[51] Int. Cl............................................. A23l 1/26
[58] Field of Search ............ 426/96, 175, 213, 221, 426/190, 342, 380, 442, 456

[56] References Cited
UNITED STATES PATENTS
3,767,430 10/1973 Earle, Jr. et al. ................. 426/380
3,787,592 1/1974 Mitchell ............................ 426/380

Primary Examiner—A. Louis Monacell
Assistant Examiner—E. L. Massung
Attorney, Agent, or Firm—Thaddius J. Carvis; Daniel J. Donovan; Bruno P. Struzzi

[57] ABSTRACT

Sucross-fixed acetaldehyde is prepared using paraldehyde as a starting material and depolymerizing it to acetaldehyde during fixation. The paraldehyde is admixed with a supersaturated aqueous sucrose solution, and crystallization is caused to proceed at such temperatures and at such a rate that the paraldehyde is rapidly depolymerized to acetaldehyde which is fixed within the sucrose crystals. The acetaldehyde is preferentially occluded within the crystal structure, leaving residual paraldehyde in solution.

11 Claims, 1 Drawing Figure

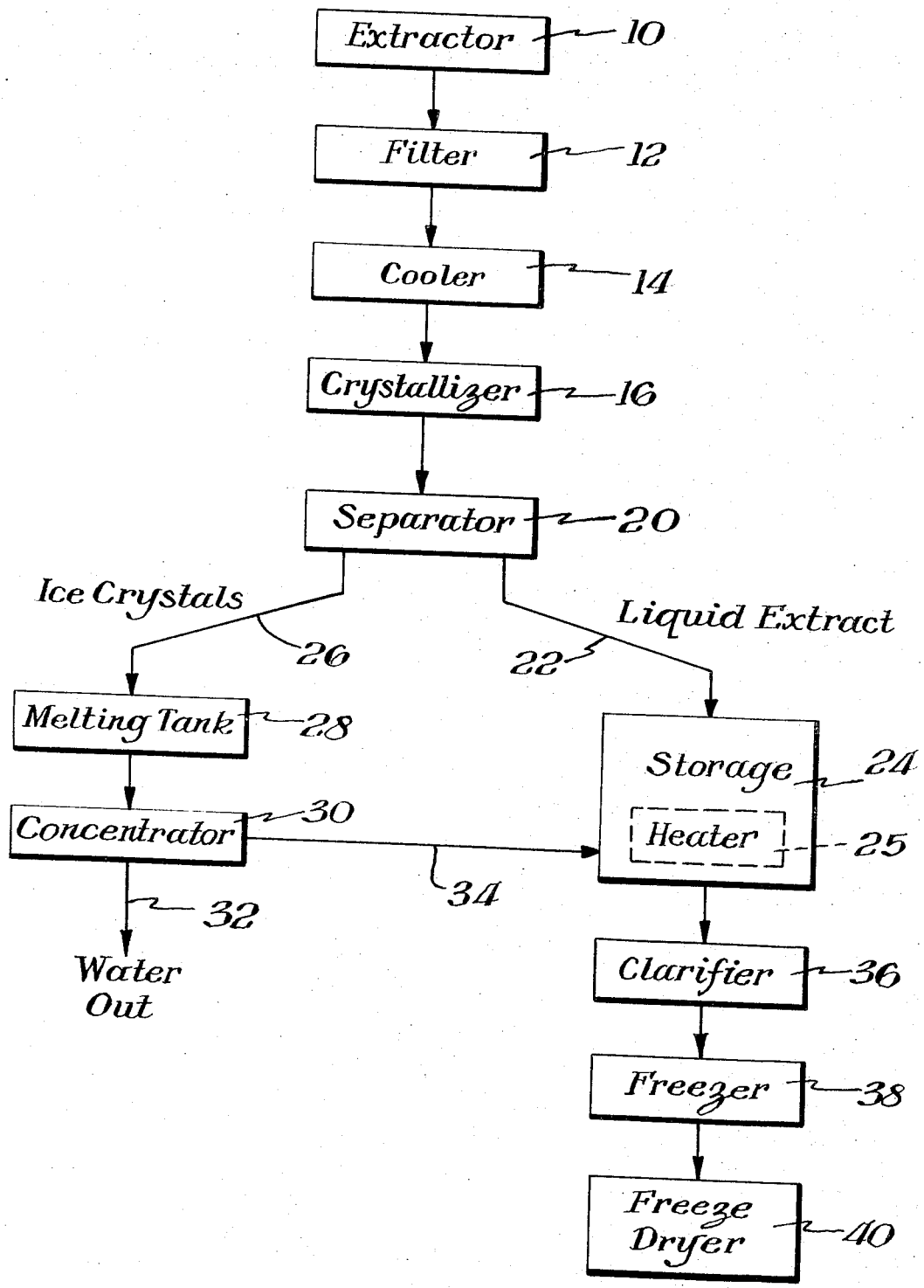

METHOD FOR PREPARING SUCROSE-FIXED ACETALDEHYDE

BACKGROUND OF THE INVENTION

This invention relates to sucrose-fixed acetaldehyde, and, more particularly, to an improved process for preparing the same.

It has been known for some time that acetaldehyde is an important flavor component of fresh fruits and vegetables and serves as a flavor enhancer for various natural flavor notes. In particular, acetaldehyde has been found to be very important in increasing the impact and frshness of certain flavors, especially fruit-type flavors.

However, in spite of the desirable attributes of acetaldehyde, it has been only recently that it could be employed in dry mixes. Acetaldehyde is chemically very reactive; it is very soluble in water; and it has a low boiling point (21°C). It exists as a gas at normal room temperature and pressure. It, furthermore, is readily oxidized to form acetic acid, and it easily polymerizes to form paraldehyde and metaldehyde. Thus, the problem confronting the food industry in augmenting the flavor and aroma of dry powdered mixes has been that of "fixing" acetaldehyde in a sufficiently stable state to avoid volatilization and/or chemical reaction during storage. It also is necessary to limit the degree of fixation to permit the release of the acetaldehyde compound during the normal household preparation of rehydrating or otherwise preparing a finished table product from the powdered mix (e.g. by addition of either hot or cold water).

Generally speaking, there are two methods of fixing acetaldehyde to insure improvement in shelf stability. One method is to chemically react the acetaldehyde with another material to form a more stable compound. The second method is to physically entrap or coat the acetaldehyde with a stable compound such as sugar, gum or other edible material.

Although many attempts, such as U.S. Pat. No. 2,305,621, have been made to produce suitable functional derivative compounds by reacting acetaldehyde with other chemical compounds, with few exceptions, they have not resulted in operational successes. The major causes of the failures have been instability of the resulting product or, conversely, too great a stability to provide utility.

The second method, of physically encapsulating the acetaldehyde within a stable compound, has not met with commercial success until only recently. The primary reason for this poor record of success has been that the products prepared in this manner have tended to lose their fixed flavor during storage, especially in the presence of moisture.

Recently a process was discovered whereby low amounts of acetaldehyde could be tenaciously fixed within crystalline sucrose. This process and the sucrose-fixed acetaldehyde product are described and claimed in copending U.S. Ser. No. 36,666, filed May 12, 1970, now U.S. Pat. No. 3,787,592.

Unfortunately, however, acetaldehyde is extremely volatile and can be handled only with difficulty. This volatility and the resulting precautions which must be taken because of it, tend to compromise process economics.

SUMMARY OF THE INVENTION

Accordingly, it is an object of the present invention to provide a process for producing sucrose-fixed acetaldehyde which avoids the problems associated with the volatility of acetaldehyde.

This and other objects are accomplished according to the present invention which provides an improved process for preparing sucrose-fixed acetaldehyde which comprises: admixing paraldehyde with a supersaturated, aqueous sucrose solution; causing crystallization to proceed at such temperatures and at such a rate that the paraldehyde is rapidly depolymerized to acetaldehyde which is fixed in the sucrose crystals; and drying the sucrose-fixed acetaldehyde.

DETAILED DESCRIPTION OF THE INVENTION

This invention is based upon the discovery that paraldehyde, which is easily handled, can be employed in place of acetaldehyde, which is handled only with difficulty, in the preparation of sucrose-fixed acetaldehyde.

According to the invention, a supersaturated, glassy, aqueous sucrose solution, preferably comprising from 88 to 93 percent sucrose based on the combined weight of the sucrose and water, and paraldehyde is formed from which the sucrose is crystallized. The supersaturated, glassy, aqueous sucrose solution is desirably formed by boiling an unsaturated, aqueous sucrose solution to a temperature of from about 118°C to about 130°C to reduce the water content to within the range of from about 7% to about 12%, and cooling the solution to achieve supersaturation, preferably to a temperature of greater than about 60°C and more preferably of from about 75°C to 100°C.

Those skilled in the art will be aware that the cooling operation to obtain the supersaturated, glassy sucrose solution should be conducted with caution to avoid crystallization of the sucrose before the desired temperature is achieved and the paraldehyde has been added. Specifically, vibration should be avoided as this may tend to cause spontaneous crystallization even in the absence of seed crystals. Additionally, the solution should be protected from the settling of any foreign material therein which could act as seed to initiate crystallization.

It is desirable that the supersaturated solution be essentially glassy. It has been found in practice that solutions containing significant amount of crystals before the crystallization step in the presence of the volatile flavoring compound do not form the desired stiff, crumbly crystalline product mass. These solutions form, instead, a soupy slurry containing relatively large crystals. It is presently believed that this occurs because crystallization from a solution containing significant amounts of crystals tend to form larger crystals, and the surface area of these crystals is not sufficient to tie up all of the water present. In any event, the desired results achieved when a glassy supersaturated solution is obtained are real and reproduceable and applicant does not wish to be bound to any particular theory.

The particular temperature to which the sucrose solution is cooled before crystallization depends upon a critical balancing of the rate at which the paraldehyde is depolymerized to acetaldehyde and the rate of crystallization. The rate of depolymerization increases with increasing temperature, while the rate of crystallization decreases with increasing temperature. Therefore, at low temperatures, impractically low amounts of acetaldehyde are produced for incorporation into the rapidly-crystallizing sucrose. Therefore, the temperature must be at least to a practical minimum level, e.g. about 60°C and preferably about 75°C, where the rate of depolymerization is sufficient to supply practical quantities of acetaldehyde for occlusion within the individual sucrose crystals. Additionally, it is preferred to maintain the temperatures below a practical maximum, e.g. about 100°C, where the degree of supersaturation is sufficient to propagate a good rate of crystallization, and to avoid the problem of too rapid volatilization of the acetaldehyde and paraldehyde.

Temperatures greater than about 100°C can be employed where the crystallization is carried out under increased pressure or with the aid of reflux. It is noted, however, that crystallization is somewhat retarded by superatmospheric pressure. On the other hand, conducting crystallization at somewhat elevated temperatures with the aid of a reflux condenser can provide desirable results but is seen to add unnecessary expense. According to this embodiment, the volatile flavoring compound is rapidly volatilized, condensed and recycled to the supersaturated sucrose solution which is maintained under constant agitation while crystallizing and cooling. When employing this procedure, crystallization can be started and the paraldehyde added at temperatures of up to about 10°C below the boiling point of the aqueous sucrose solution.

The paraldehyde is desirably added to the supersaturated sucrose solution in the desired amount with stirring before crystallization. Desirably, it is added in an amount in excess level of acetaldehyde to be fixed in the sucrose. For example, in the case where it is desired to fix acetaldehyde at a level of about 0.05% to 0.20% based on the weight of the sucrose, the paraldehyde is desireably added to the supersaturated sucrose solution at a level of from about 1.0% to 3.0% based on the weight of the sucrose. Lower amounts can of course be employed, and a finite amount of acetaldehyde will be fixed within the crystals as long as there is any acetaldehyde available in the supersaturated sucrose solution.

Crystallizing sucrose from the supersaturated, glassy, aqueous sucrose solution containing the volatile flavoring compound is accomplished in conventional manner. The resulting crystals have an amount of the acetaldehyde fixed within the individual sucrose crystals at a level of less than about 0.25% by weight of the crystal. Typically, the acetaldehyde will be fixed at a level of from about 0.05% to about 0.20% when an excess of paraldehyde is employed in the supersaturated sucrose solution.

Typically, crystallization is effected by seeding the supersaturated sucrose solution with a small amount of sucrose crystals; e.g., on the order of 0.1% or less based on the weight of the solution. If desired, the sucrose seed can be added simultaneously with the voltile flavoring compound. Stirring is maintained for the duration of crystallization.

Crystallization proceeds rapidly on stirring. During the initial period of crystallization, the supersaturated solution remains relatively transparent in appearance. Then, after a few minutes, the solution begins to cloud and the sucrose crystallizes out, desirably to form a stiff, crumbly mass.

The stiff, crumbly mass of sucrose crystals desirably contains no appreciable amounts of mother liquor which need to be removed before drying. If desired, this mass is crumbled and air dried at a temperature about equal to that of the crumbly mass upon termination of crystallization for a period before drying at elevated temperatures. However, it is possible to immediately subject the crystals to slightly elevated temperatures, on the order of about 30°C to 40°C, with only minimal loss of volatile flavoring compound due to redissolution of the crystals. The redissolution, and loss of voltile flavoring compound, can be mitigated by maintaining an initially low temperature differential between the mass and a relatively high volume of rapidly-moving, low-relative-humidity air. Thus, in this manner, elevated temperatures can be employed without raising the temperature of the mass due to the constant removal of heat by the vaporization of the water. The temperature is optimally, progressively increased during drying at such a rate that the remaining mother liquor always remains supersaturated. Those skilled in the art will be aware of the appropriate temperatures, humidities and flow rates. Obviously, the temperature differential between the crumbly mass and the drying air can be raised as the degree of moisture is reduced. The final drying temperature can be within the range of from about 60°C to about 140°C, preferably above 100°C.

The acetaldehyde is of course the desired compound and the paraldehyde is undesirable in the final product. When operating at the preferred, relatively high sucrose and low water contents, which permits efficient drying without removing the mother liquor, an undesirably high level of paraldehyde may be retained in the product. Accordingly, an undesirable odor and flavor are imparted to the crystals. Advantageously, when drying temperatures of greater than about 60°C are employed, the residual paraldehyde impurities are removed from the sucrose-acetaldehyde product, presumably by depolymerization and volatilization.

The improved process of the present invention can be employed to tenaciously fix acetaldehyde within individual crystals of sucrose at the desired level up to a maximum of about 0.25% based on the weight of the sucrose. Ordinarily, a fix at a level of about 0.05% to 0.20% is achieved using an excess of paraldehyde during crystallization. When employed in dry beverage or dessert mixes it is usually desirable to use crystalline sucrose-acetaldehyde prepared according to the present invention which contains the voltile flavoring compound fixed therein at a level of less than about 0.25%, e.g. at about the 0.05% to 0.20%. However, for other applications, such as an acetaldehyde-containing sugar for sprinkling on and enhancing the flavor of foodstuffs such as fruits (e.g. strawberries, peaches, raspberries, etc.), relatively low amounts, e.g. on the order of 0.001% to 0.05%, of acetaldehyde may be desirable.

The following Example is presented for the purpose of further explaining and illustrating the present invention and is not to be taken as limiting in any sense. Unless otherwise specified, all parts and percentages are by weight.

EXAMPLE

One hundred mls of water were placed on 350 g of sugar in a sauce pan. This mixture was heated to 130°C (about 93% solids). The syrup was cooled to 80°C and 5 mls of paraldehyde were added as well as some sucrose crystal seed. The mixture was then stirred and poured on aluminum foil for further crystallization and cooling. The crystals were air dried at ambient temperature for 2 hours and then dried at 130°C and cooled. A white sucrose-acetaldehyde product with a clean taste was produced. The product was a little tacky.

Thus, the present invention provides a method for producing sucrose-fixed acetaldehyde which avoids the need for using highly volatile acetaldehyde as the starting material. By this process the sugar syrups need not be cooled as low as when acetaldehyde is employed. Accordingly, production costs can be considerably reduced. Additionally, when employing the desired high solids contents according to the present invention, the product can be made without separation of mother syrups.

The above Example and explanation are for the purpose of teaching those skilled in the art how to practice the present invention. Upon reading this disclosure, those skilled in the art will be aware of a number of modifications and variations. It is contemplated that these modifications and variations be included within the scope of the present invention which is defined by the following claims.

What is claimed is:

1. A method for producing sucrose-fixed acetaldehyde which comprises:
   a. admixing paraldehyde with a supersaturated, aqueous sucrose solution;
   b. causing crystallization to proceed at such temperatures and at such a rate that the paraldehyde is rapidly depolymerized to acetaldehyde which is fixed in the sucrose crystals at a level of less than about 0.25% by weight of the crystal; and
   c. drying the sucrose-fixed acetaldehyde.

2. The method according to claim 1 wherein the supersaturated sucrose solution comprises from about 88% to 93% sucrose based on the combined weight of the sucrose and water.

3. The method according to claim 1 wherein crystallization is initiated at a temperature of greater than about 60°C.

4. The method according to claim 3 wherein crystallization is effected at a temperature within the range of from about 60°C to 100°C.

5. The method according to claim 1 wherein the acetaldehyde and paraldehyde which are released to the air during crystallization are condensed and recycled to the supersaturated sucrose solution.

6. The method according to claim 1 wherein the acetaldehyde is fixed within the crystals at a level of from about 0.05% to 0.20%.

7. The method according to claim 1 wherein the stiff, crumbly mass is broken apart prior to drying.

8. The method according to claim 1 wherein the drying is initiated with high-velocity, low-relative-humidity air.

9. The method according to claim 1 wherein the drying is effected by subjecting the sucrose-fixed acetaldehyde to an initially low temperature and progressively increasing the temperature as drying is accomplished, the rate of increase being such that the remaining mother liquor always remains supersaturated.

10. The method according to claim 9 wherein the initial drying temperature is about equal to that of the sucrose-fixed acetaldehyde upon termination of crystallization.

11. The method according to claim 10 wherein the final drying temperature is above 100°C.

* * * * *

UNITED STATES PATENT OFFICE
CERTIFICATE OF CORRECTION

Patent No. 3,843,822            Dated Oct. 22, 1974

Inventor(s) William A. Mitchell

It is certified that error appears in the above-identified patent and that said Letters Patent are hereby corrected as shown below:

The drawings appearing should be cancelled.

Column 1, line 59, after "the" change "sur-" to read -- "fixing" --.

Column 4, line 50, after "the" and before "flavoring" change "voltile" to read -- volatile --.

Signed and Sealed this twenty-ninth Day of July 1975

[SEAL]

Attest:

RUTH C. MASON
Attesting Officer

C. MARSHALL DANN
Commissioner of Patents and Trademarks